Sept. 8, 1964

G. SMITH ETAL 3,147,696

PRINT UNIT

Original Filed July 7, 1959

Inventor
Geoffrey Smith
Hans Meyer
By
Watson, Cole, Grindle & Watson
Attorney

Sept. 8, 1964  G. SMITH ETAL  3,147,696
PRINT UNIT

Original Filed July 7, 1959   10 Sheets-Sheet 3

Inventor.
Geoffery Smith
Hans Meyer
By
Watson, Cole, Grindle & Watson
Attorney

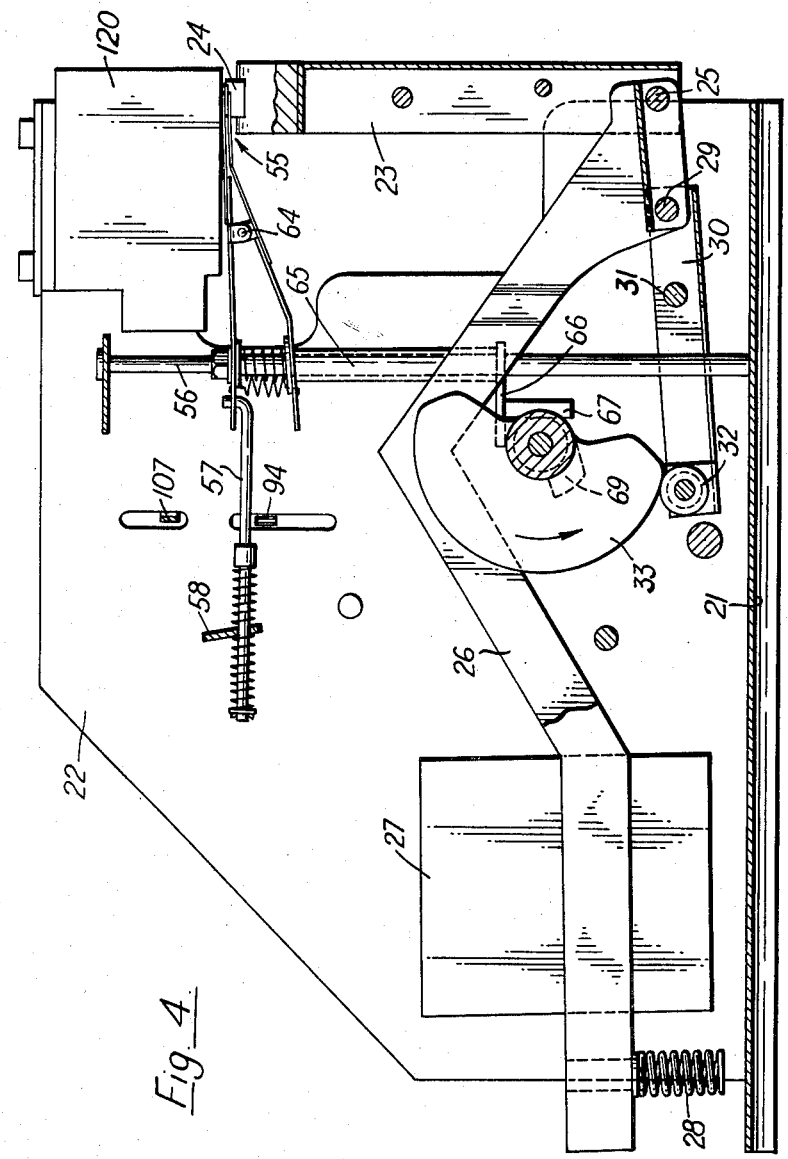

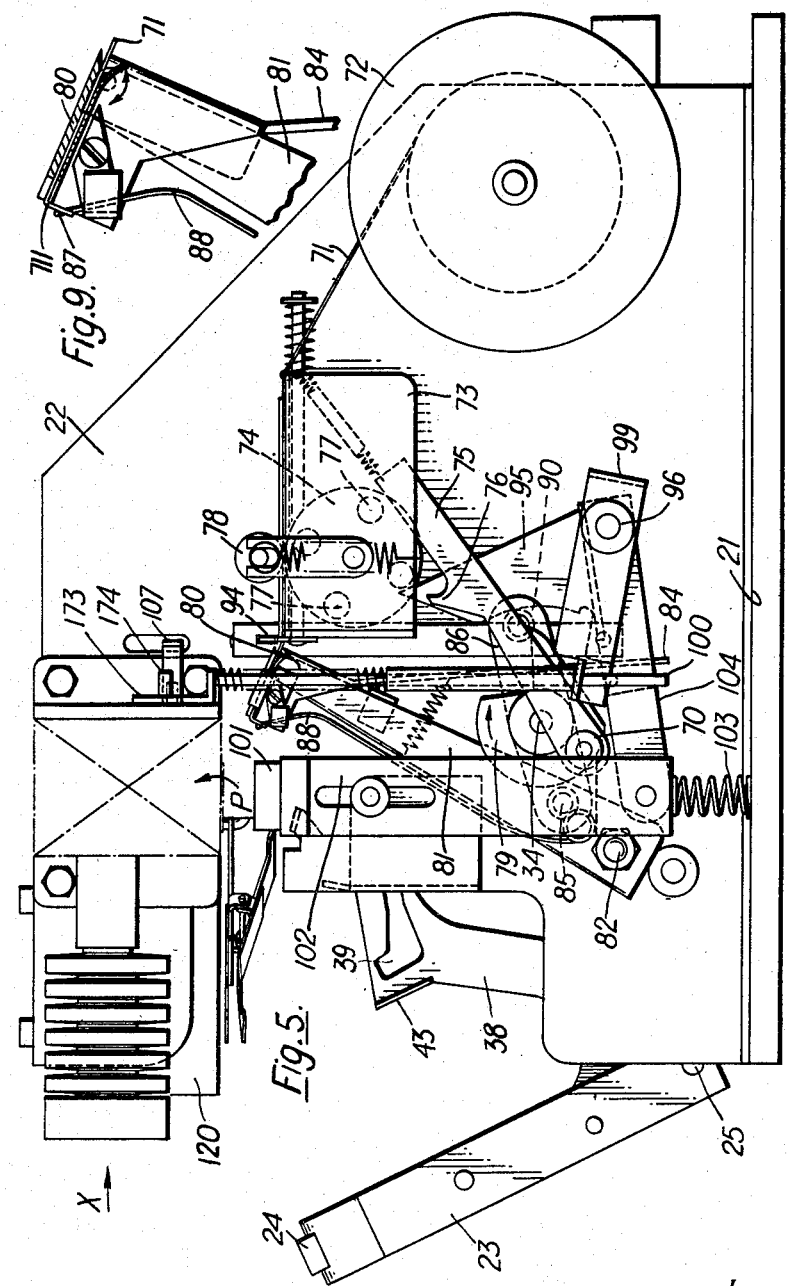

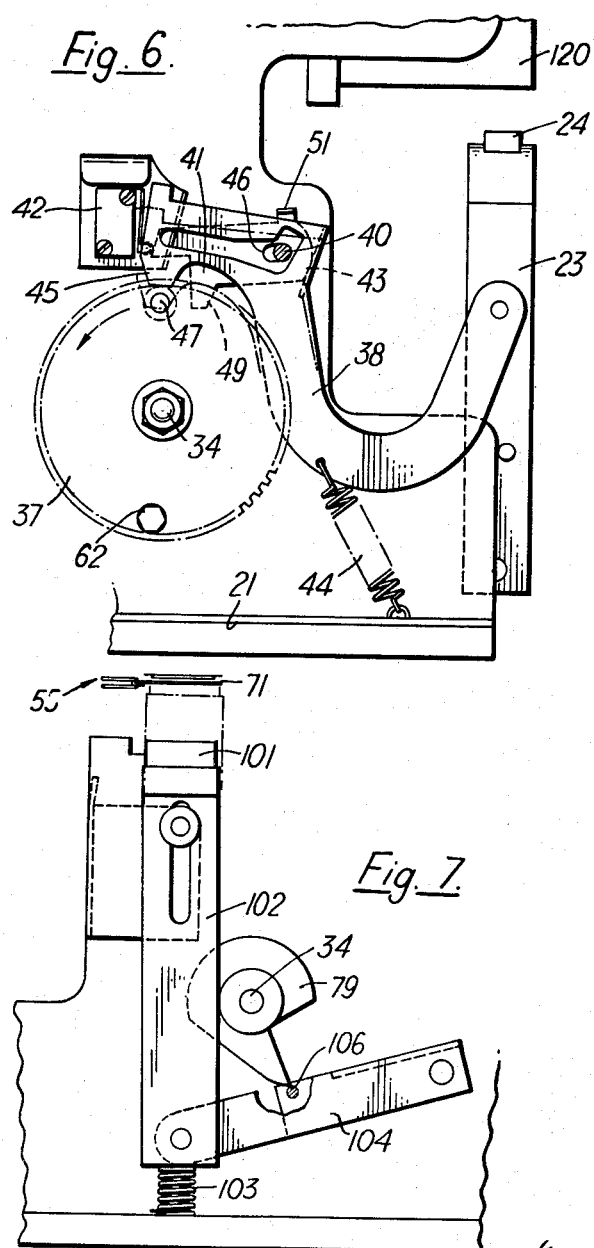

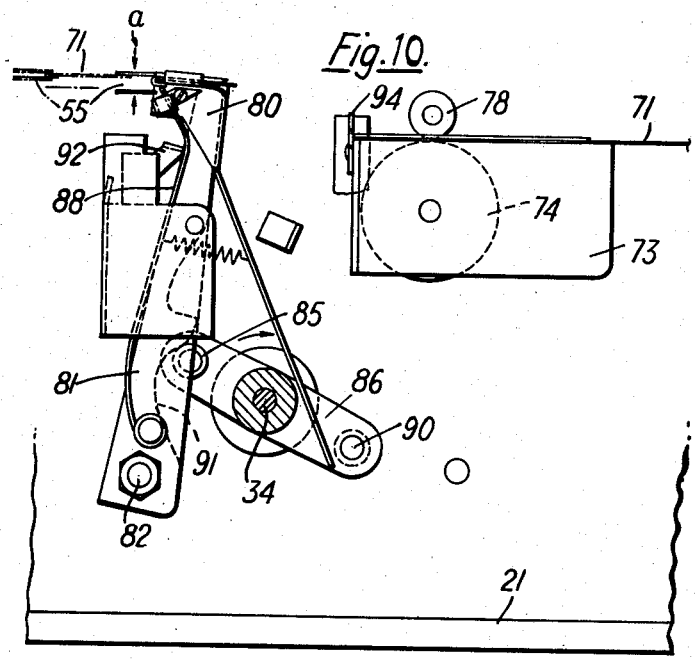
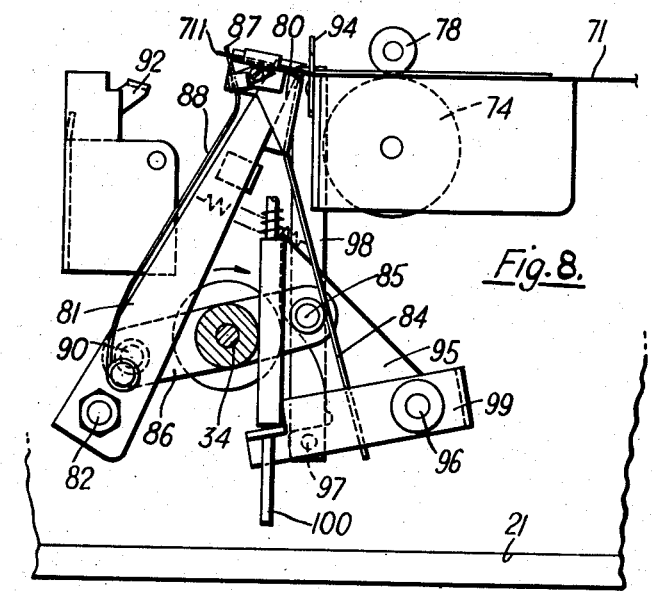

Sept. 8, 1964 G. SMITH ETAL 3,147,696
PRINT UNIT
Original Filed July 7, 1959 10 Sheets-Sheet 8

Inventor
Geoffrey Smith
Hans Meyer
By
Watson, Cole, Grindle & Watson
Attorney

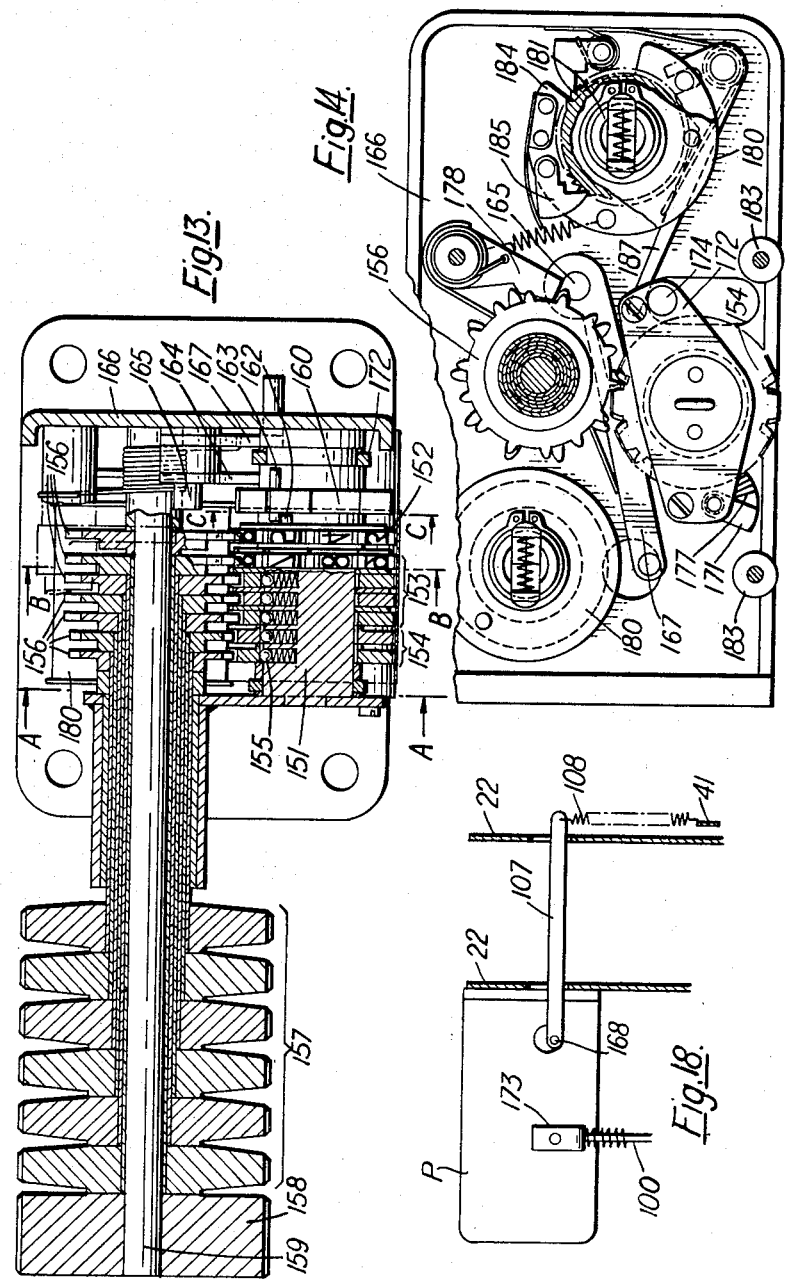

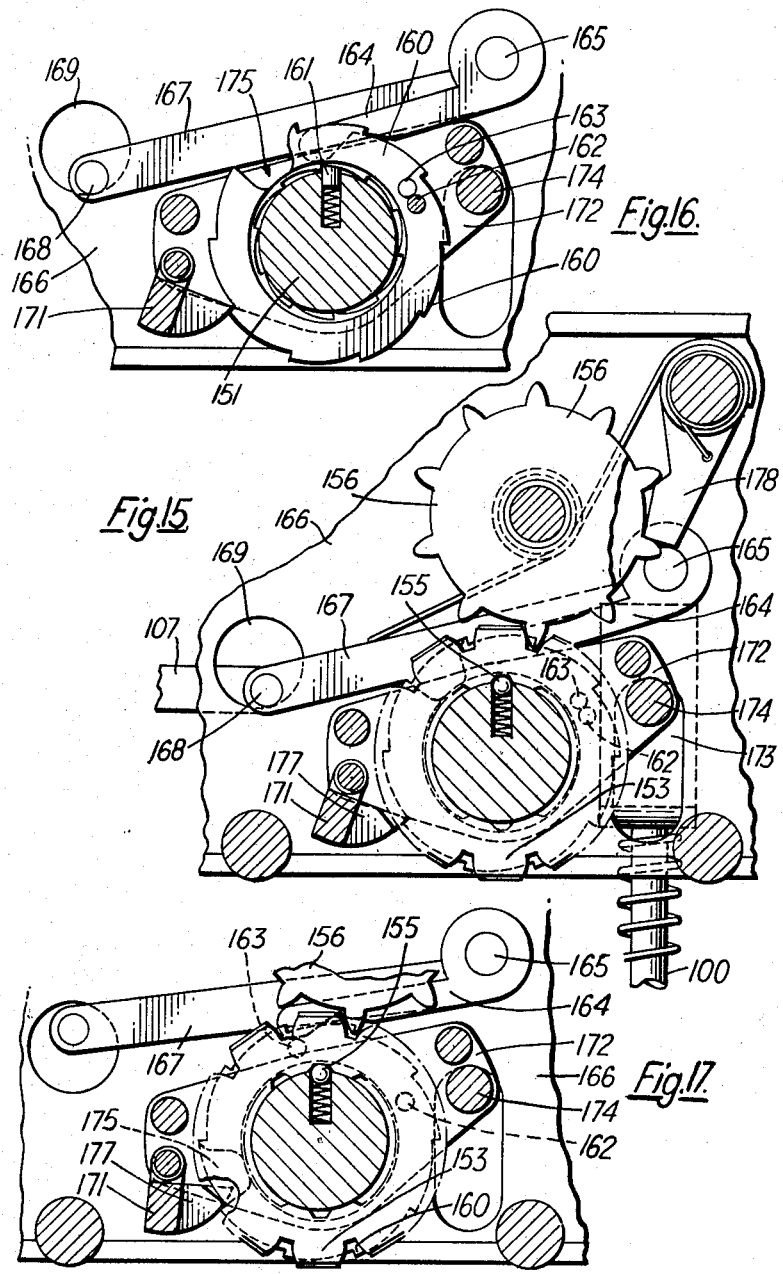

United States Patent Office 3,147,696
Patented Sept. 8, 1964

3,147,696
PRINT UNIT
Geoffrey Smith and Hans Meyer, London, England
Original application July 7, 1959, Ser. No. 825,565. Divided and this application Dec. 2, 1960, Ser. No. 73,418
5 Claims. (Cl. 101—79)

The present invention relates to apparatus for printing markings on tabs or labels adapted to be attached to other articles, and is divided from the G. Smith et al., application Serial No. 825,565 filed July 7, 1959, which is concerned with the marking of textile articles such as articles of clothing by attachment thereto by heat and pressure of heat sealable tabs or labels, formed for example from a strip of material provided with a thermoplastic component, and to which identification characters are applied before attachment to the article.

Such tabs or labels may for example be intended for the temporary marking of articles during the course of laundry or dry-cleaning operations and it may form part of the machine described in the aforesaid application Serial No. 825,565.

More particularly the main object of the present invention is to provide a printing mechanism which is adapted to print a predetermined number of identical markings on tabs intended for application to a number of articles forming, for example, a set or batch. This feature is important where each customer's order may comprise a number of associated articles, such as the separate parts of a suit. In this case the printing mechanism includes means to print a character representing said predetermined number and means are provided to stop or disable a tab applying machine when the said predetermined number of articles have been marked and until the printing mechanism has been re-set for the next batch.

The printing mechanism may include serial number printing mechanism having digit transfer mechanism which is advanced automatically by one unit on completion of the printing of the said predetermined number.

In a preferred arrangement of printing mechanism there are several serial number printing wheels which may be associated with other wheels for printing other identification characters, and also a batch number printing wheel for printing a character representing the predetermined number of articles in each batch. The serial number printing wheels and the batch number printing wheel are associated with accessible selector wheels by which the operator may preselect the serial number and in some cases the other identification characters, and may, by a setting movement of the batch number wheel, adjust the mechanism for the particular number of tabs which are to have identical markings printed thereon. The selector wheel for the batch number is preferably the outermost wheel most conveniently accessible to the operator, since this wheel has to be re-set for each batch of articles.

Before marking each batch of articles the batch number selector wheel is pre-set according to the number of articles in the batch, and then the tabs are marked. Each bears the same serial number (and other identification markings), and the same "number-in-batch" number. On each operation of the machine a ratchet wheel is advanced one step.

One construction of a machine incorporating the present invention is hereinafter described by way of example with reference to the accompanying drawings wherein.

Figure 1:
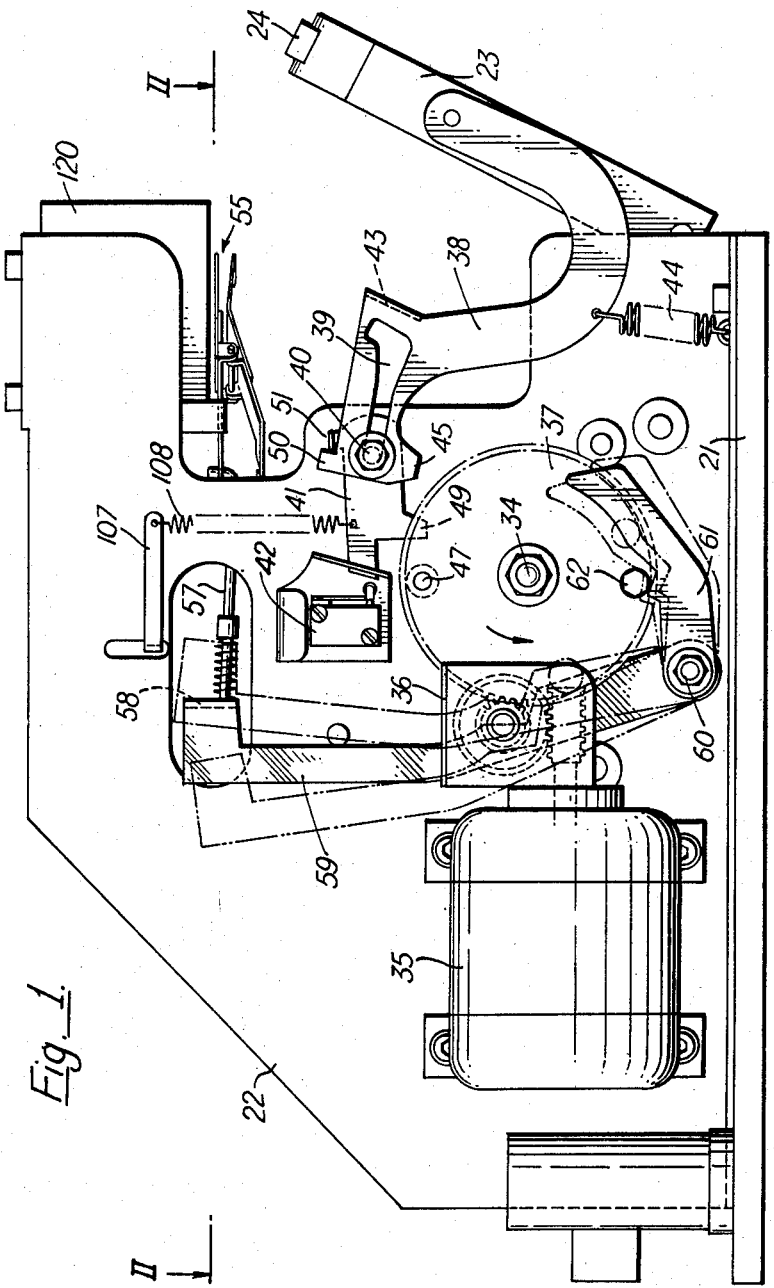
FIG. 1 is a side view of the machine with the protecting cover removed.
Figure 2:
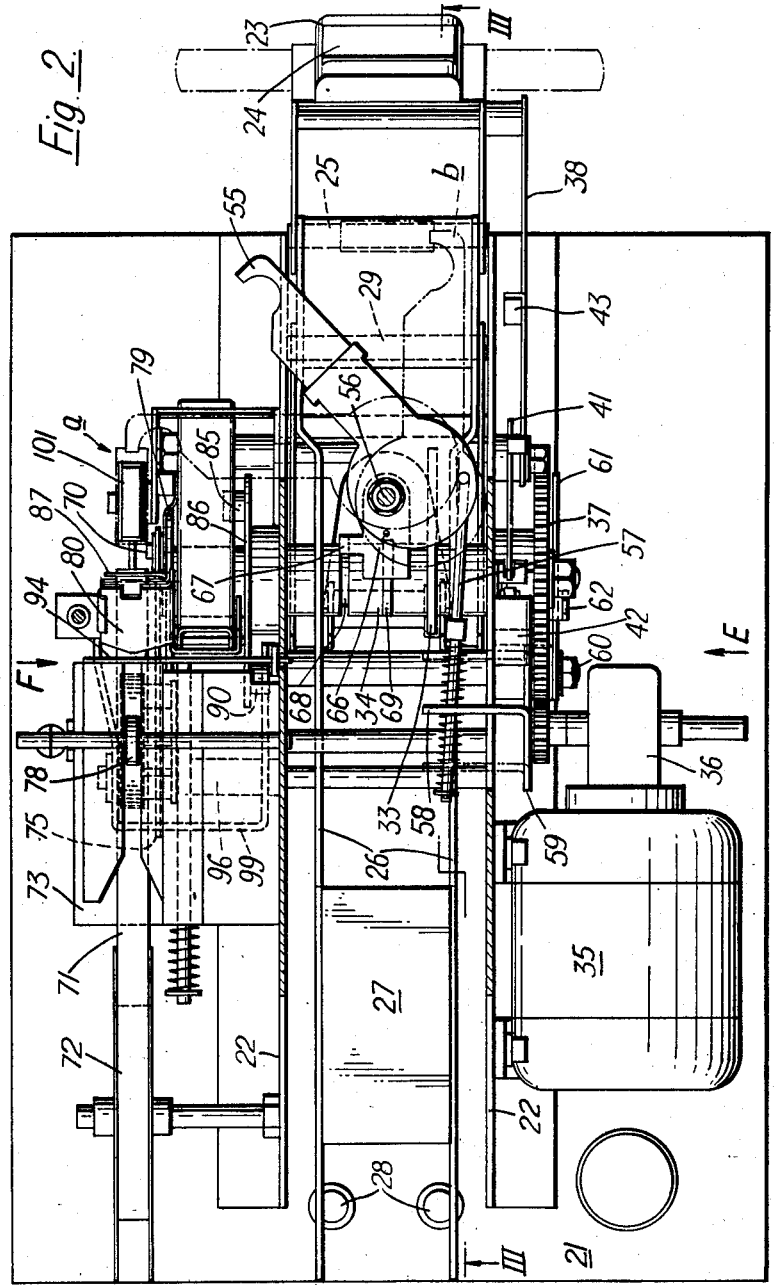
FIG. 2 is a part sectional plan view on the line 11—11 of FIG. 1.
Figure 3:
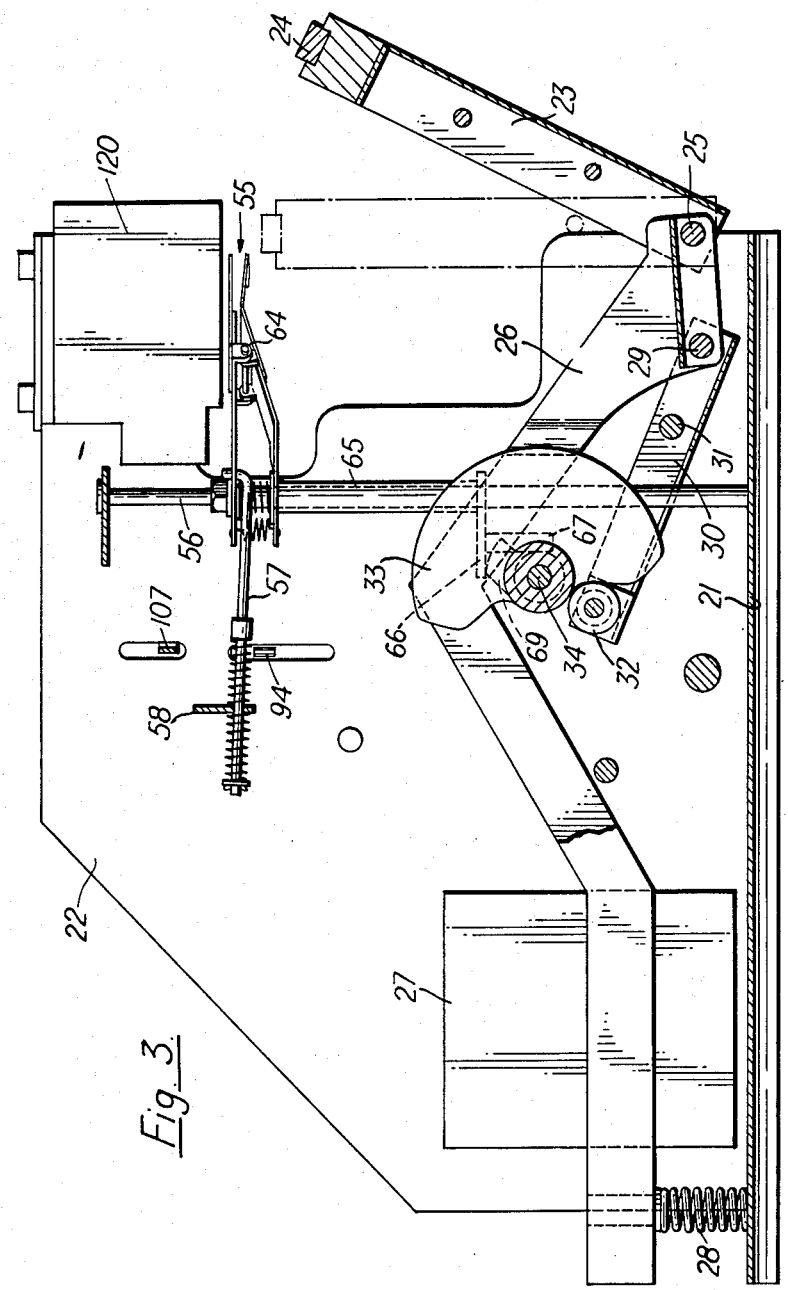
FIG. 3 is a sectional elevation on the line 111—111 of FIG. 2.
Figures 11, 12:
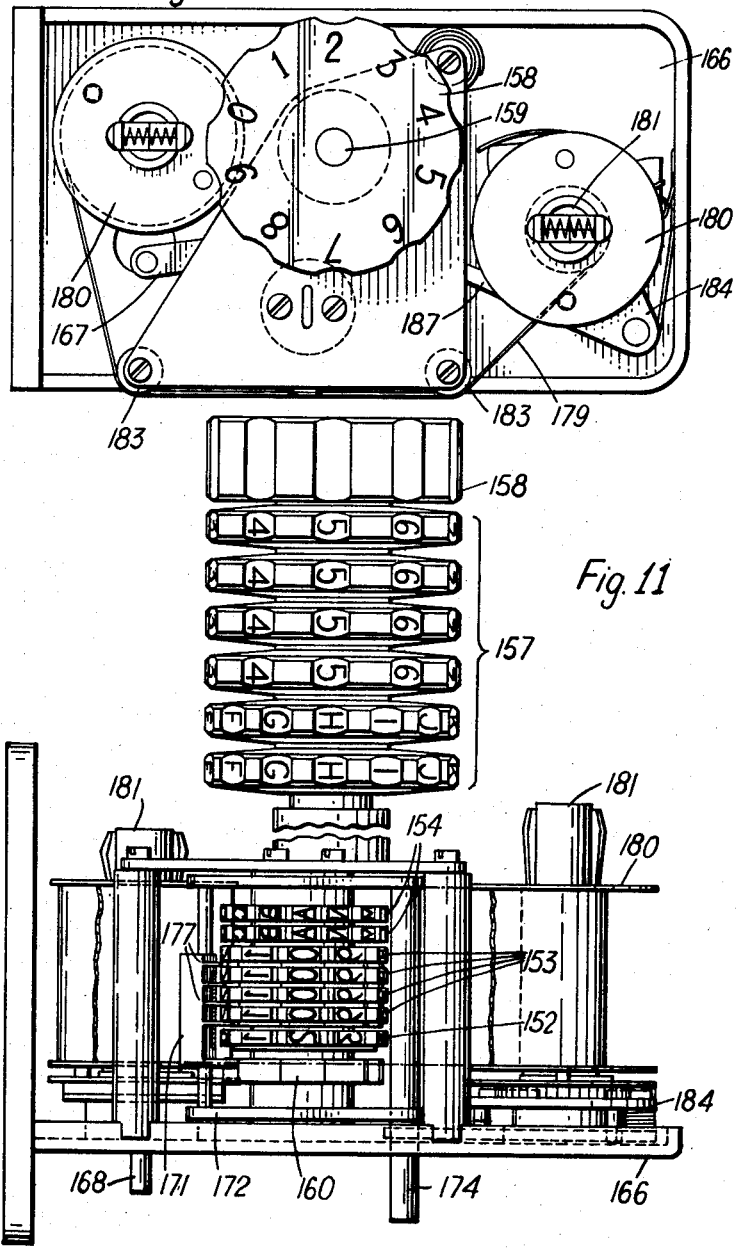

FIG. 4 is a view similar to FIG. 3 showing the operating parts in the pressing position, FIGS. 1, 3 and 4 being taken in the direction of the arrow E in FIG. 2, FIG. 5 is a side elevation view seen in the direction of the arrow F in FIG. 2 and is a view similar to FIG. 1 as seen from the other side of the machine, FIG. 6 is a detail view showing the operation of the motor start-stop mechanism, FIG. 7 is a detail view showing the operation of the printing platen, FIGS. 8, 9 and 10 are detail views showing the operation of the tab forming mechanism, FIG. 11 is an underneath view of the print unit, FIG. 12 is a front view of the print unit, FIG. 13 is a longitudinal cross-section of the print unit, FIG. 14 is a cross-section of FIG. 13 on the line A—A, FIGS. 15 and 16 are partial cross-sectional views on a larger scale, respectively on the lines B—B, C—C respectively of FIG. 13, FIG. 17 is a view similar to FIGS. 15 and 16, but showing the cut-off arm in its alternative position, and FIG. 18 is a detail view indicating the connection of the cut-off arm to the motor control means.

As shown on FIGS. 1 to 10 of the accompanying drawings, the machine comprises a main frame having a base plate 21 and side plates 22. It is enclosed in a casing, not shown, only the pivotally movable article support 23 and the selector wheels for the print unit being exposed. The support 23 has a yieldable presser face 24 and is pivotally mounted at 25 upon lever arms 26 which extend between the side plates 22 of the machine and carry a relatively massive weight 27 at the opposite end. The levers embody spring buffers 28 resting on the base plate 21 of the machine in the inoperative position of the article support 23 as shown for example in FIG. 3.

Intermediately of the levers 26 and preferably comparatively close to the pivot 25 is a pivot pin 29 pivotally interconnecting the levers 26 and a further lever 30 pivoted at 31 between the side plates 22. The other end of the lever 30 carries a follower roller 32 engageable by a cam 33 on a main shaft 34.

The main shaft 34 is driven by an electric motor 35 through suitable reduction gearing indicated at 36, the final drive being by means of a gear wheel 37 on the outer side of the main frame 22.

As shown in FIGS. 1 and 5 the article support is pivotally connected to a U-shaped latch arm 38 having an L-shaped slot 39 co-operating with a fixed pin 40 secured to one side frame member 22. The pin 40 also supports an actuator slide 41 which is slotted as indicated at 46 (FIG. 6) to permit the actuator slide 41 to come into operative engagement with a switch 42, which may be a micro switch, for starting and stopping the motor 35. The latch arm 38 is provided with an inturned flanged edge part 43 (FIG. 2) which, when the article support 23 is moved inwardly from the loading position shown in FIG. 1 to the pressing position shown in FIGS. 3 (in chain-dot lines) and in FIG. 6 presses against the end face of the actuator slide 41 and moves the latter into operative engagement with the switch 42 to start the motor 35.

The U-shaped latch arm 38 is subjected to the action of a pull-down spring 44 and is provided with a depending nose portion 45 which, in the starting position shown in FIG. 6, engages a pin 47 on the gear wheel 37 and thus initially holds the forward end of the latch arm 38 in the uppermost position shown in full lines in FIG. 6. However, immediately after the article support 23 has been moved to the inward position shown in FIG. 6, the motor 35 will normally be started by the closing of switch 42 and the gear wheel 37 then rotates in the anti-clockwise direction as seen in FIGS. 1, 3, 4, and 6 so that the pin 47 disengages from the nose part 45 and allows the latch arm 38 to drop so that the nearly vertical part of the slot 39 drops on to the pin 40 thus locking the article support 23 in the vertical position of FIG. 6. If, however, the motor 35 has not been started for any reason, locking upon the pin 40 does not occur so that the article support 23 can be moved to its forwardly pivoted position.

Operation of the motor continues since the actuator slide 41 is held in its switch-operating position by the engagement of the flange 43 against the slide 41. The motor continues to operate for one complete marking cycle represented by one revolution of the gear wheel 37 and of the main shaft 34. Towards the end of this revolution the pin 47 engages a depending lug part 49 of the actuator slide 41 and lifts the end part of said slide out of engagement with the switch 42 so that the motor stops at about the same moment that the pin 47 again engages the nose part 45 to lift the latch arm 38 to disengage it from the pin 40, permitting the article support 23 to move to its inclined position as shown in FIG. 1. Towards the end of this return movement a projecting portion 50 of the latch arm 38 engages a lug portion 51 of the actuating slide 41 and returns it to its starting position ready for the next operation of the machine and permits the actuator slide 41 to return to its down position shown in FIG. 1 without further actuating the switch 42.

Means are provided for forming tabs and for positioning the formed tabs over an article applied to the article support 23 when the latter is moved to the vertical pressing position as shown in FIG. 6. The tabs so formed are fed to the marking position by means of a gripper 55 comprising relatively movable jaws. This gripper is movable through an angle of approximately 90° from the tab receiving and marking position *a* to a tab-applying position *b* both indicated in FIG. 2. In the normal inoperative position of the machine the gripper 55 is located at an intermediate position approximately as shown in FIG. 2 and is then moved first in the anti-clockwise direction to the tab receiving and marking position *a* and then swung through 90° to the tab applying position *b*. This gripper is rotatable on a vertical rod 56 and operated by an axially movable connector rod 57 by spring transmission means from a projecting arm 58 forming part of a lever 59 pivoted to one side frame 22 at 60, and lying between the gear wheel 37 and the frame 22. In FIG. 1 the lever 59 is shown in full lines in its normal intermediate position corresponding to the intermediate position of the gripper shown also in full lines in FIG. 2. The lever 59 is connected to a projecting arm 61 lying on the outer side of gear wheel 37, and which is shaped for co-operation with a pin 62 projecting from the outer face of the gear wheel 37, said cam being shaped so that when the motor is started the pin 62 presses the arm 61 in the downward direction so that the arm 58 moves the connecting rod 57 towards the right-hand side of FIG. 1 to move the gripper 55 to the position *a* to pick up a tab. As the pin 62 moves away from the arm 61 the pin 47 on the opposite side of the gear wheel 37 engages a side face part of the lever 59 and moves this reversely through to the end alternative position shown in chain double dot lines to actuate the gripper 55 to transfer the formed and marked tab to the position *b* in FIG. 2.

The construction of the gripper 55 is also shown on FIG. 3 of the drawings: it comprises upper and lower jaw members the lower jaw being pivotally mounted at 64 and engaged by the flanged head of a sleeve 65 slidable but not rotatable upon the rod 56 upon which the whole gripper 55 rotates when actuated by the connector rod 57. The sleeve 65 is guided at its lower end by a projecting plate 66 having a depending blade 67 fitting within a groove 68 of the main shaft 34, thus preventing rotation of the sleeve 65 while permitting vertical movement by the engagement of a cam element 69 on the main shaft with the plate 66. These means provide for the opening and closing of the jaws of gripper 55 as and when required.

The operation of the tab forming mechanism will now be described with reference to FIGS. 8 to 10. A strip 71 of tab-forming material is supplied from a suitable storage reel 72 mounted on the other side frame 22 of the machine and is fed over a guide unit 73 housing a serrated feed wheel 74 operated step-by-step on each operation of the machine by means of a feeder bar 75 having a lug 76 which engages successive driving pins 77 on the wheel 74. A suitable spring operated presser wheel 78 is arranged above the feed wheel 74 to provide counter pressure to ensure the feed of the strip 71 on each operation of the machine. The feeder bar 75 is rotatable upon a crank pin 70 on a cam disc 79 carried by the main shaft 34 so that on each operation of the machine the feed wheel 74 delivers (feed position in FIG. 8) a tab-forming length of the strip 71 into a guide member 80 pivotally mounted on the end of a lever 81 pivoted at 82 to one side frame 22 of the machine. During the feed motion of the strip 71 (FIG. 8) the guide member 80 is displaced relatively to the lever 81 by means of a projecting arm portion 84 depending from the guide 80 which engages a pin 85 on the outer side of an arm 86 fixed to the main shaft 34. Due to the pivoting motion of the guide member 80 the projecting tip part 711 of the strip 71 is located beneath a presser bar 87, this presser bar being formed by a bent end part of a spring blade member 88 extending along the leading edge of the lever 81.

After the new length of strip 71 has been projected so that the tip part 711 lies beneath the presser bar 87, the guide member 80 pivots on the lever 81, due to the rotation of the shaft 34 and the movement of the pin 85, and reaches the position shown in FIG. 9 so that the presser bar 87 serves to bend the leading tip part 711 downwardly at right angles to the length of the strip. On continuing movement of the main shaft 34 the pin 85 on the arm 86 engages a cam surface 91 associated with the lever 81 to move the latter to the position shown in FIG. 10 where a fixed projection 92 engages the spring 88 to cause the presser bar 87 to complete the folding under of the tip part 711 to form the finished tab. On first operation of the gripper 55, the finished tab held by the guide 80 is engaged by the gripper and is then ready to receive a printed marking. Before the lever 81 commences to move from the position in FIGS. 8 and 9 the tab-forming length of strip 71 is severed from the strip by means of a pivoted cutter 94 which is shown in FIG. 10 at the end of its cutting stroke. Actuation of the cutter 94 is performed from the main shaft 34 by engagement of the pin 90 on the opposite face of the arm 86 to the pin 85, with the camlike edge of a rocker plate 95 pivoted on a pin 96 on the main frame 22. This rocker plate 95 is linked by pivot 97 to a vertical slide bar 98 operating the cutter 94. The rocker plate 95 is also attached to a U-shaped member 99 (as seen in FIG. 2) linked to vertical push-rod 100 serving to advance the batch register of the print unit P.

The present invention is concerned with the print unit P which serves for marking identification numerals on the tab or label held by the gripper 55, and is described in detail hereinafter with reference to FIGS. 11 to 16. Such unit comprises a number of type means for printing identification characters on the tab or label. The act of printing is performed by a platen member 101 and it will be seen that the operation of the guide 80 to the position shown in FIG. 10 brings the tab or label to a position over the platen 101 where it is engaged by the gripper 55. During the operating cycle of the machine a previously formed tab or label has been transferred from the guide 80 to the gripper 55 and held by the latter over the platen 101 after guide 80 has returned to the FIG. 8 position.

At the commencement of the tab applying cycle a sharp upward movement is applied to the platen 101 to perform the printing operation. As shown in FIGS. 5 and 7 the platen 101 is carried by a vertically movable strip 102 subjected to the action of a spring 103 and pivotally connected to a lever 104 controlled by the engagement of a pin 106 with the cam 79 on the main shaft 34. Prior to printing motion the cam 79 depresses the lever 104 and the strip 102 thus compressing the spring 103 and when the pin 106 passes off the peak of the cam 105 the spring 103 becomes operative to force the strip 102 and the platen 101 upwardly with a hammer-like action to print a marking from the type faces of the print unit P on the tab or label carried by the gripper 55 thus marking a clear impression on the tab. After the printing operation a circular portion of the cam 105 holds the platen 101 in an intermediate position such as is shown in FIG. 5.

In operation of the machine as described so far it may be assumed that the parts are in the starting position shown in FIGS. 1 to 3, the gripper 55 is in an intermediate position and the tab-forming mechanism is in the starting position shown in FIG. 5, a length of tab strip 71 being already severed. An article to be marked is placed on the support 23 and the latter is pressed inwardly to the chain-dot line position shown in FIG. 3 thus starting the motor 35 and initiating one complete revolution of the main shaft 34. After a short interval the cam 33 on the main shaft depresses the roller 32 and lifts the article support 23 which is already latched in the vertical position by engagement of the nearly vertical section of the slot 39 on the pin 40. Initially the right-hand end of the lever 26 is raised to press the article and the tab or label positioned thereover into engagement with a heated fixed platen 120 supported between the side frame members 22. When operative engagement with the platen has been effected the continuing lift action of the cam 33 is transmitted through the lever 26 to the weight 27 so that the latter becomes operative to provide the effective upward pressure on the article support 23, the position of the parts at this time being indicated on FIG. 4. It will be appreciated that the cam 33 has a circular face portion the dimensions of which control the period for which pressure is maintained upon the article and the tab or label, it being assumed that the motor 35 and the main shaft 34 operate at constant speed.

Dealing now with the operation of the tab forming and feed mechanism. It will be seen that at the commencement of the operating cycle the guide 80 was in the position shown in FIGS. 5 and 9 and is then actuated to complete the formation of the tab and to position it over the platen 101 where it is engaged by the gripper 55 and thereafter the guide 80 returns to its starting position and the commencement of the formation of the next tab is initiated as shown in FIG. 8. The preceding tab now held by the gripper 55 receives a printed impression by the operation of the platen 101 and thereafter by the partial rotary movement of the gripper 55 the marked tab is brought to a position overlying the article fed into the marking position by the article support 23, these various operations being performed at the same time as the article is being brought into the marking position and before the support 23 is raised by the cam 33. The gripper 55 holds the folded-under end part 711 of the tab clear of the presser face 24 and due to this fact and to the fact the folded-under end part of the strip is incapable of adhering to the article a non-adherent finger grip is thereby formed. On completion of the marking and tab-applying cycle the article support 23 is released and this moves to its starting position shown in FIGS. 1 to 3 ready for the next marking cycle and the gripper 55 returns to its intermediate starting position.

The print unit P incorporates a batch register adapted to be preset according to the number of tabs or labels intended to receive identical markings, and said print unit embodies a cut-off arm 107 which is actuated from the batch register on completion of the printing of the last tab or label pertaining to that batch. The cut-off arm 107 is adapted to disable the machine by preventing further operation of the motor 35. This may be performed by a separate switch connected in series with the switch 42 or conveniently and as shown the cut-off arm 107 extends through a slot in the side frame members 22 and is linked through a tension spring 108 to the actuator slide 41 so that after printing the last tab or label the slide 41 is lifted and is thus made inoperative when the article support 23 is moved inwardly.

It may be desirable to arrange for the print unit P to print an identification marking on the customer's receipt or token and for this purpose a hand-operating member may be provided for the platen 101 and arranged so that this printing does not actuate the batch register. This hand actuator may embody a cam device and depresses the plate 102 to compress the spring 103 and then releases it to perform the printing operation, these operations being performed independently of the cam 79.

In some cases it may be desirable to vary the operative pressing time and/or the effective pressure in order to adapt the machine for applying tabs or labels to widely varying types of articles to be marked. For this purpose an externally operable control knob or dial may be provided which is adapted either to displace the weight 27 on the lever arms 26 so as to vary the pressure, and/or alternative cams 33 may be brought into operation so as to vary the pressing time. In many cases the adjustment may vary both factors, i.e. the operative pressure and the pressing time, simultaneously, and the operating means may be calibrated with markings representing the different types of article which may be marked.

FIGS. 11 to 16 show the print unit P, wherein a main spindle 151 rotatably supports a plurality of printing wheels comprising a batch number printing wheel 152, a plurality of serial number printing wheels 153 and preferably a number of further printing wheels 154. Each of the wheels 153 and 154 is provided with a plurality of depressions in its bore engageable with a row of spring pressed balls 155 arranged in the spindle 151 thus serving to locate the printing wheels in their various operative positions. A series of recesses formed between the type faces of each wheel 152, 153, 154 are in driving engagement with a row of sprocket wheels 156 which are connected to a plurality of selector wheels 157 by means of concentric sleeves. The sprocket wheel 156 engaging the batch number wheel 152 is connected to a batch selector wheel 158 located on the outer side of the selector wheel assembly and connected to its associated sprocket wheel 156 by means of a central spindle 159.

It will be seen that by rotation of the selector wheels 157 it is possible to pre-select the positions of the print wheels 153 and 154, while by rotation of the selector wheel 158 it is possible to select the position of the batch number printing wheel 152. With the mechanism in the position shown in FIGS. 11 and 12 the print unit is set for printing two labels for a batch of two articles both of which will receive the marking AA0000 2.

Rotatably mounted adjacent the batch number printing wheel 152 is a ratchet wheel 160 forming the batch register; the bore of the wheel 160 formed with ratchet-like teeth engageable by a spring pressed pawl 161 which prevents retrogressive movement of the ratchet wheel 160. A pin 162 on the side face of the batch number printing wheel 152 is adapted to engage a pin 163 traversing the ratchet wheel 160 and, on the other side of said ratchet wheel, is adapted to engage a follower arm 164 pivotally mounted on a pin 165 fixed to a supporting frame member 166 and fixedly connected to an arm 167 having a pin 168 extending through an aperture 169 in the side frame 166 and fixedly connected to the cut-off arm 107 for stopping the machine.

The ratchet wheel 160 is advanced one step on each operation of the machine, and for this purpose a pivotal comb-like digit transfer pawl 171 is mounted on a swing frame 172 operatively connected to the vertically movable rod 100 actuated on each operation of the machine to which the print is fitted. Conveniently the rod 100 is provided with an angle member 173 at the top which engages a pin 174 projecting from the swing frame 172 through a slot in the frame member 166.

At what may be termed the zero position of the ratchet wheel 160 a deep slot 175 is formed in the wheel 160 so that when the transfer pawl 171 enters the deep slot 175 in the zero position comb-like finger parts 177 of the transfer pawl 171 are adapted to engage selectively with teeth of progressively increasing depth adjacent the print wheels 153 at points corresponding to the numeral "9" to provide a digit transfer mechanism to advance the wheels 153 serially in well-known manner in the zero position of the ratchet wheel 160. This position of the transfer pawl 171 is indicated on FIG. 17 of the drawings from which it will also be seen that at the same time the pin 163 has engaged the follower arm 164 to lift the arm 167 and thus to operate the cut-off member 107, thereby preventing further operation of the machine.

It will, therefore, be understood that the batch number selector wheel 158 must be reset before the tab applying machine with which the print unit is associated, can be operated again. The ratchet wheel 156 in operative engagement with the batch number printing wheel 152 is associated with a spring-pressed holding pawl 178 which prevents rotation of the selector wheel 158 in the anticlockwise direction of FIGS. 12 and 15. By clock-wise rotation of the selector wheel 158 the batch number printing wheel 152 is rotated in the anti-clockwise direction and the pin 162 (shown in FIG. 17 in the position for printing the character "2") is moved until it engages the pin 163 (in the zero position of the selector wheel 158 and of the batch printing wheel 152), and then on continuing movement of the selector wheel the pin 162 displaces the pin 163 which then releases the arms 164 and 167 and advances the ratchet wheel 160 to an extent determined by the movement of the selector wheel 158 to a new position representing the number of articles in the next batch. The pins 162 and 163 thus form a lost motion connection between the printing wheel 152 and the batch register ratchet wheel 160 and remain in engagement in whatever new position is selected by the selector wheel 158 until the unit is actuated.

In the embodiment shown, with the release of the arms 164 and 167 the tab applying machine is again ready for operation to print the next batch of tabs or labels, the number being printed having been advanced by one unit from the previous marking by the action of the transfer comb 177 associated with the transfer pawl 171. Suppose the next batch of articles comprises five articles then, in the example quoted, five identical tabs or labels would be printed each marked AA0001 5, the final operation being to advance the print wheel to the next serial number, i.e. AA0002, and then to stop the machine until the selector wheel 158 has been re-set by rotation through the zero position.

The printing operation is conveniently performed through an ink ribbon 179 fed from spools 180 mounted on suitable support spindles 181 carried by the frame member 166, the ribbon 179 being led over guide rollers 183 and over the type faces of the printing wheels 152, 153, 154.

Any suitable means may be provided for advancing one of the spools 180 step-by-step and by a small amount on each operation of the machine, these means comprising for example a connector rod 187 operated from the swing frame 172 and rotating a ring 184 carrying a ratchet feed device 185.

Any suitable means may be provided if desired for reversing the feed of the ribbon when one spool 180 is exhausted so that the ribbon is automatically fed backwards and forwards; such ribbon reversal has not been shown on the drawings as such mechanism is well-known in the art.

In the example of printing unit referred to the two initial letter characters may for example be used as Branch Depot identifying characters, while the four serial number characters are intended to represent successive customer's orders. Of course, additional serial number printing elements could be provided if desired, while the Branch identification characters could be printed by other means than rotatable externally selectable print wheels. They could for example be provided by exchangeable type face elements fitted within the print unit proper.

What we claim is:

1. A label marking device for a machine for attaching identification tabs to batches each consisting of a variable given number of textile articles, comprising identification character tab marking means, additional tab marking means, both said marking means imparting identical markings to tabs on all articles, counting means for recording the successive operations of the machine, means for advancing said counting means step-by-step in one direction from a starting position on successive operations of the marking device for the said given number in said batch of articles towards an end position after every article of said batch has been marked, presettable selector means for rotating said counting means selectively in the same direction to a starting position spaced from said end position before marking a subsequent batch of articles, the said starting position being determined by said selector means according to the said given number for the following batch of articles, and means operable by said counting means for preventing operation of the machine after said identical markings have been applied to all said given number of tabs, wherein said counting means includes a ratchet wheel advanced step-by-step in one direction at successive marking operations, a batch number printing wheel, setting means for adjusting said batch number printing wheel and means on said batch number printing wheel to advance said ratchet wheel in the same direction to a preset position representing a number of articles in a batch corresponding to the number of steps by which the ratchet wheel is advanced to a predetermined position where operation of the machine is prevented.

2. A label marking device as claimed in claim 1, including a projecting member on the ratchet wheel adapted to operate in said predetermined position, a movable member, means linked to said movable member for stopping further operation of the machine and a projecting member on the batch number printing wheel adapted to come into operative engagement with said projecting member on said ratchet wheel to advance said ratchet wheel in the same direction as the step-by-step movement of said ratchet wheel to preset the position of said ratchet wheel such that a predetermined number of advancing steps may be imparted to said ratchet wheel after which the projecting member on the ratchet wheel comes into operative engagement with the said movable member.

3. A label marking device as claimed in claim 2, including a pawl feed member engageable with said ratchet wheel to advance said wheel step-by-step, said ratchet wheel embodying a deep notch at a position corresponding to the engagement of said projecting member with said movable member to cause simultaneous advance of a series of serial number printing wheels as the ratchet wheel reaches the position where the projecting member operates the movable member.

4. A label marking device for a machine for attaching identification tabs to batches each consisting of a variable given number of textile articles, comprising serial number printing means for printing a serial identification character on said tabs, means to advance said serial number printing means by one unit after printing the variable given number of articles in each batch of identification tabs, presettable means for printing a character distinct from said serial number indicating said variable given number of articles in each successive batch, manual adjustment means for presetting the variable number in said presettable means, means holding the serial number printing means setting and the variable number setting to impart identical markings to each batch of tabs equal to the variable number for attachment to respective articles in each successive batch of articles, counting means for recording the successive operations of the machine, means for advancing said counting means step-by-step in one direction from a starting position on successive operations of the marking device for the said given number in said batch of articles towards an end position after every article of said batch has been marked, presettable selector means coupled to the presettable means for printing a variable given number to operate therewith for rotating said counting means selectively in the same direction to a successive starting position for the following batch spaced from said end position before marking a subsequent batch of articles, and locking means operable by said counting means for preventing operation of the machine after said identical markings have been applied to all said given number of tabs until said counting means has been rotated into said successive starting position.

5. In a machine for attaching identification tabs to batches of textile articles each consisting of a variable given number of articles, a label-marking device comprising a plurality of serial number printing wheels coaxially aligned, means for selectively advancing said printing wheels, an additional printing wheel coaxially aligned with said wheels for printing an additional character registering said given number, means for causing said serial number printing wheels and said additional printing wheel to print said given number of identical tabs for attachment to said given number of articles with the identification serial number and the number of articles in the batch, counting means presettable according to said given number, means for operating said counting means on each operation of the machine, means for advancing said serial number printing wheels by one digit following printing of the last of said given number of tabs, lock-out means for locking out the machine when said counting means register a given position after printing all said tabs and means for releasing said lock-out means on further presetting of said counting means in accordance with the number of articles in the subsequent batch.

References Cited in the file of this patent

UNITED STATES PATENTS

| | | |
|---|---|---|
| 1,916,966 | Cunningham | July 4, 1933 |
| 2,528,740 | Carothers et al. | Nov. 7, 1950 |
| 2,622,804 | Hamisch | Dec. 23, 1952 |
| 2,672,810 | Keuper | Mar. 23, 1954 |
| 2,748,676 | Braun | June 5, 1956 |
| 2,821,122 | Long | Jan. 28, 1958 |
| 3,036,519 | Sloan et al. | May 29, 1962 |